US009584542B2

(12) United States Patent
Kim et al.

(10) Patent No.: US 9,584,542 B2
(45) Date of Patent: Feb. 28, 2017

(54) RELAY ATTACK COUNTERMEASURE SYSTEM

(71) Applicant: TEXAS INSTRUMENTS INCORPORATED, Dallas, TX (US)

(72) Inventors: Hun-Seok Kim, Ann Harbor, MI (US); Anand Ganesh Dabak, Plano, TX (US); Jing-Fei Ren, Plano, TX (US); Manish Goel, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/614,038

(22) Filed: Feb. 4, 2015

(65) Prior Publication Data

US 2015/0222658 A1 Aug. 6, 2015

Related U.S. Application Data

(60) Provisional application No. 61/935,577, filed on Feb. 4, 2014.

(51) Int. Cl.

| | |
|---|---|
| ***H04L 29/06*** | (2006.01) |
| ***H04L 29/08*** | (2006.01) |
| ***H04L 9/32*** | (2006.01) |
| ***H04W 12/12*** | (2009.01) |

(52) U.S. Cl.

CPC ........ *H04L 63/1466* (2013.01); *H04L 9/3271* (2013.01); *H04W 12/12* (2013.01); *H04L 67/12* (2013.01); *H04L 2209/805* (2013.01)

(58) Field of Classification Search

CPC ............................ H04L 63/1466; H04L 67/12

USPC .............. 726/2, 6, 7, 22; 713/161, 168, 192; 340/5.72, 426.18, 426.24

See application file for complete search history.

(56) References Cited

U.S. PATENT DOCUMENTS

| | | | | |
|---|---|---|---|---|
| 5,805,056 A * | 9/1998 | Mueller | B60R 25/1003 250/231.1 |
| 7,420,455 B2 * | 9/2008 | Nowottnick | B60R 25/24 340/5.61 |
| 2002/0078350 A1 * | 6/2002 | Sandhu | G06F 21/46 713/168 |

(Continued)

OTHER PUBLICATIONS

"Practical NFC Peer-to-Peer Relay Attack using Mobile Phones"—Francis et al, Royal Holloway University of London, Jun. 2010 https://eprint.iacr.org/2010/228.pdf.*

*Primary Examiner* — Randy Scott

(74) *Attorney, Agent, or Firm* — John R. Pessetto; Charles A. Brill; Frank D. Cimino

(57) ABSTRACT

An apparatus for preventing a relay attack that includes a microcontroller, a receiver, and a transmitter. The receiver is configured to receive a challenge message from a verifier. The challenge message has a challenge message frequency at a first challenge message frequency during a first time slot. The transmitter is configured to transmit a response message to the verifier. The response message has a response message frequency at a first response message frequency during the first time slot. The first response message frequency is different than the first challenge message frequency. The challenge message frequency is at a second challenge message frequency and the response message frequency is at a second response message frequency during a second time slit. The second challenge message frequency is different than the second response message frequency.

8 Claims, 5 Drawing Sheets

(56) References Cited

U.S. PATENT DOCUMENTS

| | | | | |
|---|---|---|---|---|
| 2010/0321154 | A1* | 12/2010 | Ghabra | B60R 25/00 340/5.61 |
| 2013/0271273 | A1* | 10/2013 | Oesterling | G07C 9/00309 340/426.18 |
| 2015/0074805 | A1* | 3/2015 | Choi | H04W 4/008 726/22 |

* cited by examiner

RELAY ATTACK COUNTERMEASURE SYSTEM

CROSS-REFERENCE TO RELATED APPLICATIONS

The present application claims priority to U.S. Provisional Patent Application No. 61/935,577, filed Feb. 4, 2014, titled "THE RANDOMIZED PHYSICAL LAYER RADIO AS A COUNTERMEASURE AGAINST RELAY ATTACKS," which is hereby incorporated herein by reference in its entirety.

BACKGROUND

Contactless wireless security systems, including automotive keyless entry systems, such as Passive Entry/Passive Start (PEPS) systems and near field communication (NFC) payment systems, face a threat referred to as a "relay attack", which permits a vehicle or payment information to possibly being stolen without the owner's awareness.

A relay attack typically involves two individuals, although any number of individuals may be utilized, working in cooperation with each other. Each of the two individuals carries a device (referred to as an attack kit) capable of receiving a signal, in the case of a PEPS system, from either the vehicle or the vehicle's key fob and forwarding the received signal to the other individual after amplifying the signal. In one scenario, the individuals follow the vehicle and its driver. The driver stops at, for example, a store or a restaurant. Individual-1 stands adjacent to the parked vehicle while individual-2 follows and stands next to the owner of the vehicle (who may be inside the store or restaurant or any other location away from the car). Individual-1 initiates a door unlock operation by touching the car handle, pulling the car handle, or pushing a button on the car, which normally requires a valid key fob to be within a certain distance of the door. Upon initiating the unlock operation, the vehicle broadcasts a wireless signal intended for reception by a valid, nearby key fob.

The attack kit carried by individual-1 picks up the wireless signal being broadcast by the vehicle and relays the signal (such as physical layer signals or encrypted bit streams) to the attack kit of individual-2. Upon receiving the signal from the attack kit of individual-1, the attack kit of individual-2 replicates the signal in the format commensurate with the key fob and transmits the replicated key fob-compliant signal to the key fob carried by the vehicle's owner (which presumably is within sufficient range of individual-2); thereby waking up the key fob. The key fob which receives the wireless signal and cannot distinguish individual-2's attack kit from the vehicle itself considers the attack kit carried by individual-2 as the vehicle, and, as it is configured to do, transmits a wireless response signal to authenticate the key fob to the vehicle. This response signal is then received by the attack kit of individual-2 which relays the signal back to the attack kit of individual-1. The attack kit of individual-1 receives the response and replicates a wireless signal compatible with the vehicle. The vehicle's wireless communication system cannot distinguish a wireless signal from the attack kit of individual-1 from the key fob itself and performs the designated operation (e.g., unlocks the door). A similar relay attack is possible on payment systems utilizing NFC technology.

SUMMARY

The problems noted above are solved in large part by systems and methods for randomizing the physical layer radio as a countermeasure against relay attacks. In some embodiments, an apparatus for preventing a relay attack includes a microcontroller, a receiver, and a transmitter. The receiver is configured to receive a challenge message from a verifier. The challenge message has a challenge message frequency at a first challenge message frequency during a first time slot. The transmitter is configured to transmit a response message to the verifier. The response message has a response message frequency at a first response message frequency during the first time slot. The first response message frequency is different than the first challenge message frequency. The challenge message frequency is at a second challenge message frequency and the response message frequency is at a second response message frequency during a second time slot. The second challenge message frequency is different than the second response message frequency.

Another illustrative embodiment is a system that includes a verifier and a prover. The verifier is configured to transmit a challenge message and receive a response message. The prover is configured to receive the challenge message and transmit the response message. The challenge message has a challenge message frequency at a first challenge message frequency during a first time slot and a second challenge message frequency during a second time slot. The response message has a response message frequency at a first response message frequency during the first time slot and a second challenge message frequency during the second time slot. The challenge message frequency is different than the response message frequency.

Yet another illustrative embodiment is an apparatus that includes a microcontroller, a receiver, and a transmitter. The receiver is configured to receive, during a first time slot and a third time slot, a challenge message from a verifier at a first frequency. The transmitter is configured to transmit, during a second time slot, a response message to the verifier at the first frequency. Each of the first, second, and third time slots have different durations.

Another illustrative embodiment is a system that includes a verifier and a prover. The verifier is configured to transmit a challenge message at a first frequency during a first time slot and to receive a response message during a second time slot time slot. The prover is configured to receive the challenge message during the first time slot and transmit the response message at the first frequency during the second time slot. The first and second time slots have different durations.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct connection. Thus, if a first device couples to a second device, that connection may be through a direct connection or through an indirect connection via other devices and connections.

As used herein, the term "vehicle" includes any type of vehicle that can be driven such as automobiles, trucks, and busses, as well as boats, jet skis, snowmobiles, and other types of transportation machines that are operable with a wireless key fob. As used herein, the term "transceiver" includes any type of wireless communication units such as transmitters, receivers, or a combination of a transmitter and a receiver.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
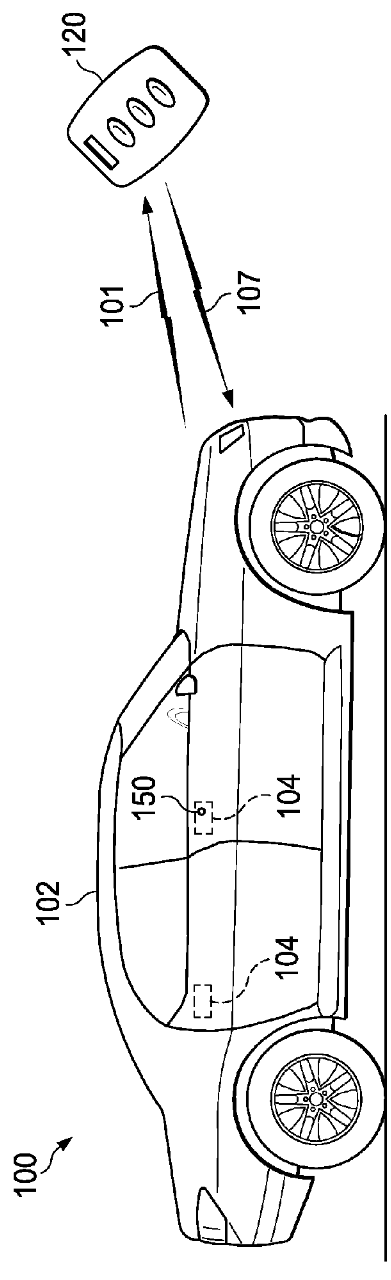
FIG. 1 shows an illustrative diagram for an arrangement of a contactless wireless security system in accordance with various embodiments.

FIG. 1 shows an illustrative diagram for an arrangement of a contactless wireless security system 100 in accordance with various embodiments. More specifically, FIG. 1 shows an example of a passive entry/passive start (PEPS) system. While a PEPS system is illustrated as an example of a contactless wireless security system 100, it should be understood that any contactless wireless security system such as near field communication (NFC) systems (e.g., NFC enabled credit card, debit card, key fob, or smartphone payment systems) fall within the scope of this disclosure. Contactless wireless security system 100 includes a verifier 102 with a plurality of wireless transceivers 104 installed at various locations around the verifier. While a plurality of wireless transceivers 104 are depicted, in some embodiments, only one wireless transceiver 104 is utilized. As illustrated in FIG. 1, verifier 102 may be a vehicle in which wireless transceivers 104 are installed around the vehicle (e.g., inside each door near the door handles, in the trunk, etc.). In alternative embodiments, verifier 102 may include a point of sale (POS) reader for verifying and processing payments utilizing NFC.

Contactless wireless security system 100 also includes prover 120 which in some embodiments is a key fob. In alternative embodiments, prover 120 may include a credit card, debit card, smartcard, smartphone, or any other device which may communicate with verifier 102. Prover 120 may be mobile; therefore, prover 120 may be carried by an individual away from verifier 102. For a verifier 102 being a vehicle, prover 120 may be configured to lock and unlock a door or the trunk and to start the vehicle. In the example in which verifier 102 is a POS reader, prover 120 may provide payment information to the reader. Prover 120 performs wireless communication with one or more of wireless transceivers 104 when prover 120 is close enough to verifier 102 such that verifier 102 is within wireless range of prover 120. Prover 120 authenticates itself to verifier 102. After a determination that prover 120 is authentic, verifier 102 may provide the desired functionality (e.g., door locking, unlocking, engine starting, payment processing).

Each transceiver 104 has the capability of transmitting a challenge message 101 to prover 120. In some embodiments, challenge message 101 is a signal which is received by prover 120 if prover 120 is within wireless range of at least one of transceivers 104. Challenge message 101, in some embodiments, causes prover 120 to transmit a response message 107 to the challenge message. In some embodiments, challenge message 101 may contain other information intended for prover 120. The response message 107 may be received by one of transceivers 104 of verifier 102. The response message 107 provides credentials to verifier 102 allowing verifier 102 to authenticate prover 120, and thus, allow verifier 102 to provide the desired functionality.

Figure 2:
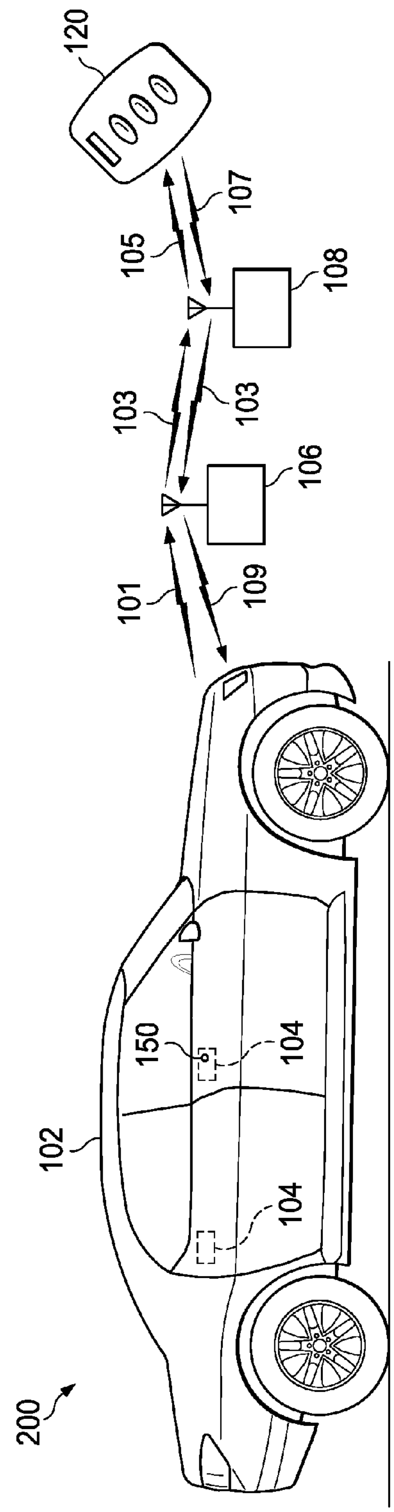
FIG. 2 depicts a possible configuration for carrying out a relay attack.

FIG. 2 depicts a possible configuration for carrying out a relay attack. Relay attack kit 106 acts as an emulator for prover 120 and relay attack kit 108 acts as an emulator for verifier 102. The attack kits 106 and 108 communicate with each other through the transmission link 103.

More specifically, attack kit 106 is brought by an individual to a location in sufficiently close proximity of verifier 102 to receive challenge message 101 from one of wireless transceivers 104 (i.e., is close enough such that attack kit 106 may communicate wirelessly with verifier 102). Attack kit 106 then may receive challenge message 101 from verifier 102 whenever verifier 102 transmits challenge message 101. Verifier 102 may continuously transmit challenge message 101 or verifier 102 may transmit challenge message 101 in response to an outside action, such as touching verifier 102 at location 150, detection by verifier 102 of movement in close proximity to verifier 102, pushing a button, or by other mechanisms to initiate the challenge-response protocol.

Once challenge message 101 begins transmitting, attack kit 106 relays challenge message 101, via transmission link 103, to attack kit 108. Attack kit 108 is within close proximity of prover 120 (i.e., is close enough such that attack kit 108 may communicate wirelessly with prover 120). Upon receiving challenge message 101 from attack kit 106 through transmission link 103, attack kit 108 generates signal 105 to be received by prover 120. Signal 105 is a copy of challenge message 101 after being relayed by attack kit 106 to attack kit 108. Prover 120 receives signal 105 from attack kit 108 and, unaware, that the signal originated from attack kit 108 instead of a verifier 102, starts to authenticate itself to verifier 102 by transmitting the response message 107 to what it believes is a valid challenge message.

Sharing the same operation principle described above, attack kit 108 emulating verifier 102, relays response message 107 to attack kit 106 via transmission link 103. Attack kit 106 transmits signal 109 copying the content of the response message 107 from prover 120. Verifier 102 receives signal 109, which is a copy of response message 107 to the challenge message 101, and authenticates the signal. Once the signal is authenticated, the individual utilizing attack machine 106 will be able to achieve the desired result (e.g., door locking, unlocking, engine starting, payment processing). This relay attack may occur despite prover 120 being so far from verifier 102 so as not to be in direct communication with verifier 102. That is, transmission link 103 between attack kits 106 and 108 may have at least one bi-directional transmission channel of a type that allows there to be a distance between the attack kits 106 and 108 that is greater than the maximum distance over which the wireless transceivers 104 of verifier 102 can directly communicate with prover 120.

Figure 3:
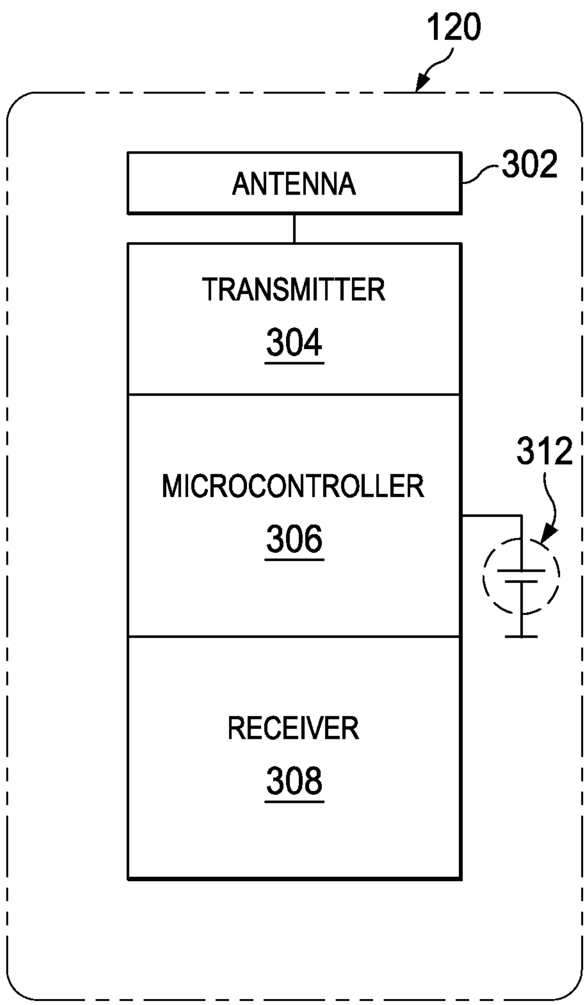
FIG. 3 shows a block diagram of an illustrative prover in accordance with various embodiments.

FIG. 3 shows a block diagram of an illustrative prover 120 in accordance with various embodiments. Prover 120 may include an antenna 302, a transmitter 304, a microcontroller 306, a receiver 308, and a battery 312. Microcontroller 306 controls the overall operation of the prover 120. Microcontroller 306 may be any type of microcontroller and may include a processor core, memory, and programmable input/output peripherals. The memory of microcontroller 306 may be in the form of flash, read-only memory, random access memory, or any other type of memory or combination of types of memory. Microcontroller 306 may implement multiple power states for prover 120 such as a lower power state and a higher power state. In the higher power state, microcontroller 306 is fully operational. In the lower power state, microcontroller 306 is generally incapable of executing instructions but can be woken up by way of, for example, an interrupt.

Receiver 308 receives signals (if any), through antenna 302 (e.g., challenge message 101 from wireless transceivers 104 of verifier 102) and, if microcontroller 306 is in a lower power state, asserts an interrupt signal to awaken the microcontroller and thereby causes the microcontroller to transition to the higher power mode. While only one antenna 302 is depicted, prover 120 may comprise any number of antennas for sending and receiving signals. Antenna 302 is also utilized to transmit signals (e.g., response message 107) generated by transmitter 304 to the wireless transceivers 104 of verifier 102. Battery 312 provides power to the respective components of prover 120.

Figure 4:
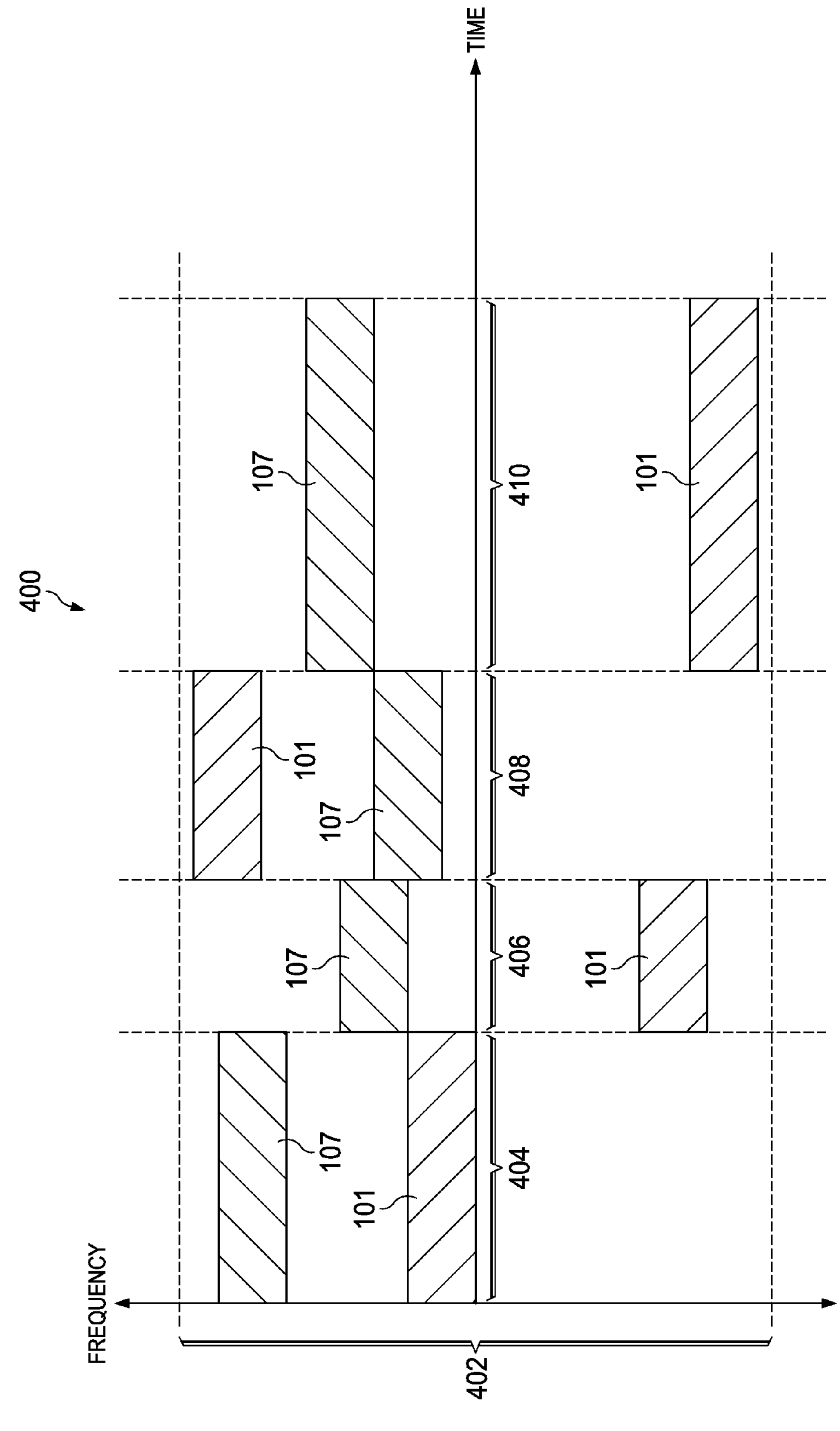
FIG. 4 shows an example challenge message and response message in accordance with various embodiments.

FIG. 4 shows an example challenge message 101 and response message 107 in accordance with various embodiments. More specifically, FIG. 4 shows an example of frequency division duplexing (FDD) with randomized frequency hopping for communications between verifier 102 and prover 120. For the example shown in FIG. 4, the radio, made up of antenna 302, transmitter 304, and receiver 308, is a full duplexing radio such that it may transmit and receive signals at the same time. In this embodiment challenge message 101 and response message 107 are transmitted at the same time at different frequencies within frequency band 402. Challenge message 101 and response message 107 may be transmitted at any frequency within frequency band 402 so long as the frequencies of challenge message 101 and response message 107 are separate and do not overlap.

Additionally, the frequencies that challenge message 101 and response message 107 are transmitted hop (i.e., change over the course of time). FIG. 4, for example, contains time slots 404, 406, 408, and 410. In each of time slots 404, 406, 408, and 410, challenge message 101 and response message 107 are transmitted simultaneously or approximately at the same time. However, after a certain amount of time (i.e., once time slot 404 ends and time slot 406 begins), both challenge message 101 and response message 107 change frequencies such that challenge message 101 is transmitted at a different frequency in time slot 406 than the frequency transmitted at in time slot 404 and response message 107 is transmitted at a different frequency in time slot 406 than the frequency transmitted at in time slot 404.

Similarly, once time slot 408 begins, challenge message 101 and response message 107 change frequencies again. Each time a new time slot begins, challenge message 101 and response message 107 may change frequencies. Challenge message 101 and response message 107, in an embodiment, may be transmitted continuously throughout each of time slots 404, 406, 408, 410, and any other time slot, just at different frequencies.

Because the frequency of transmission for challenge message 101 and response message 107 may change after each time slot, and in some embodiments, there is no relationship to which frequency each of challenge message 101 and response message 107 utilize in each time slot, the frequency utilized by challenge message 101 and response message 107 appears random to any outside device (e.g., attack kits 106 and 108).

Additionally, the duration of the time slots 404, 406, 408, and 410 may vary. In the example shown in FIG. 4, time slot 404 is longer than time slot 406 which is shorter than time slot 408 which is shorter than time slot 410. In fact, each of time slots 404, 406, 408, and 410 may have a different duration. Because the time slots 404, 406, 408, and 410 all vary in duration, and in some embodiments, there is no relationship to duration of each time slot to the next or any other time slot, the duration of each of time slots 404, 406, 408, and 410 appears random to any outside device (e.g., attack kits 106 and 108). In an embodiment, the duration of each of time slots 404, 406, 408, and 410 is less than a threshold value. Therefore, the duration of each of time slots 404, 406, 408, and 410 is minimized.

The frequencies that the challenge message 101 and response message 107 transmit at, and the duration of each of time slots 404, 406, 408, and 410 are negotiated between verifier 102 and prover 120 prior to the first time slot (i.e., time slot 404) or during the first time slot 404. This negotiation may utilize encrypted messages to agree on the frequencies and duration of time slots to avoid any other device from determining the frequency hopping and time slot duration protocol.

Because attack kits 106 and 108 do not have access to this random appearing frequency hopping scheme, attack kits 106 and 108 must relay the entire frequency hopping band to relay the challenge message 101 and response message 107. Furthermore, attack kits 106 and 108 would require full duplexing radios because verifier 102 and prover 120 are transmitting and receiving at the same time in order to relay the signals. In other words, in order to implement a relay attack, an individual would require attack kits 106 and 108 with a wideband full duplexing radio that has the capability of covering an entire band of frequency hopping. Such a device is very difficult to implement. Therefore, a relay attack is less likely.

Figure 5:
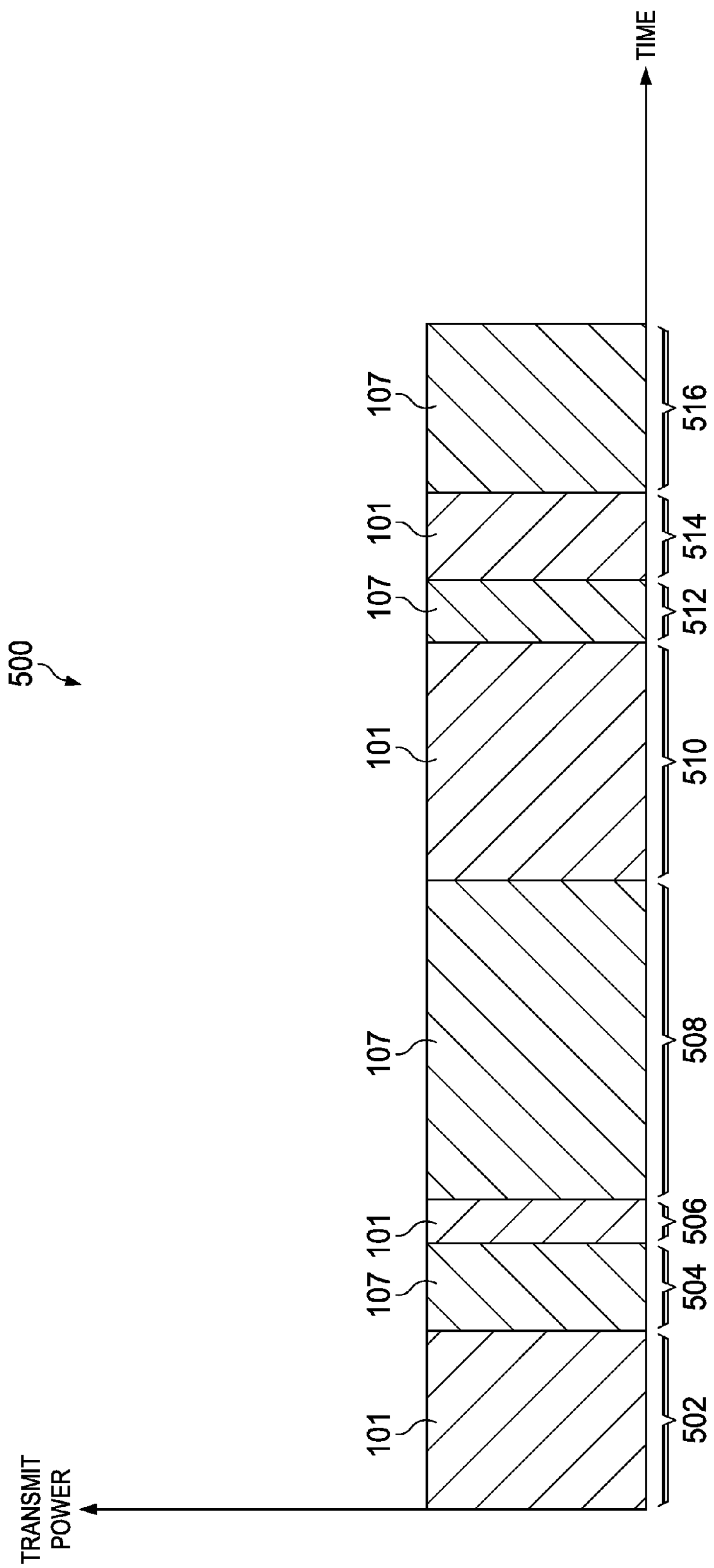
FIG. 5 shows an example challenge message and response message in accordance with various embodiments.

FIG. 5 shows an example challenge message 101 and response message 107 in accordance with various embodiments. More specifically, FIG. 5 shows an example of a time division duplexing system for communications between verifier 102 and prover 120. In the example in FIG. 5, challenge message 101 and response message 107 are transmitted at the same frequency in different time slots (e.g., time slots 502-516). For example, challenge message 101 is transmitted from verifier 102 to prover 120 in time slot 502. Response message 107 is not transmitted during time slot 502. Instead, response message 107 is transmitted from prover 120 to verifier 102 in time slot 504. Challenge message 101 is not transmitted in time slot 504.

The duration of the time slots 502-516 may vary. In the example shown in FIG. 5, time slot 502 is longer than time slot 504 which is longer than time slot 506 which is shorter than time slot 508 which is longer than time slot 510 which is longer than time slot 512 which is shorter than time slot 514 which is shorter than time slot 516. In fact, each of time slots 502-516 may have a different duration. Because the time slots 502-516 all vary in duration, and in some embodiments, there is no relationship to duration of each time slot to the next or any other time slot, the duration of each of time slots 502-516 appears random to any outside device (e.g., attack kits 106 and 108). In an embodiment, the duration of each of time slots 502-516 is less than a threshold value. Therefore, the duration of each of time slots 502-516 is minimized.

The duration of each of time slots 502-516 is negotiated between verifier 102 and prover 120 prior to the first time slot (i.e., time slot 502) or during the first time slot 502. This negotiation may utilize encrypted messages to agree on the frequencies and duration of time slots to avoid any other device from determining the time slot duration protocol. Because the authenticating response message 107 is transmitted during what appears to be randomized duration time slots, and in some embodiments in an unknown and unpredictable order, attack kits 106 and 108 must be capable of relaying signals in both directions at all times. This requires the utilization of very costly full duplexing radios. Most attack kits (e.g., attack kits 106 and 108) do not have such radios. Hence, a relay attack is less likely to succeed.

Figure 6:
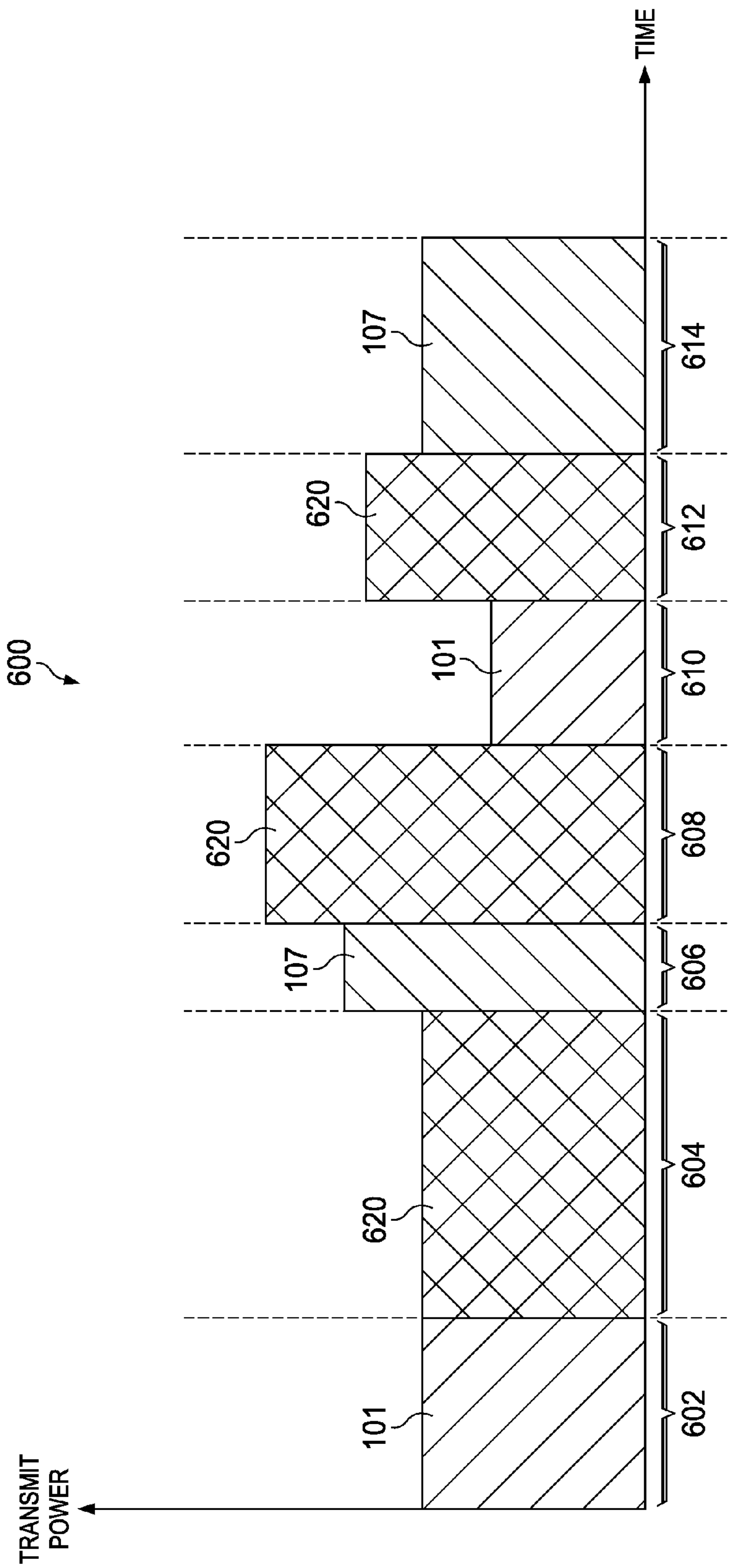
FIG. 6 shows an example challenge message and response message in accordance with various embodiments.

FIG. 6 shows an example challenge message 101 and response message 107 in accordance with various embodiments. More specifically, FIG. 6 shows an example of a time division duplexing system for communications between verifier 102 and prover 120. In the example in FIG. 6, challenge message 101 and response message 107 are transmitted at the same frequency in different time slots. For example, challenge message 101 is transmitted from verifier 102 to prover 120 in time slots 602 and 610. Response message 107 is not transmitted during time slots 602 and 610. Instead, response message 107 is transmitted from prover 120 to verifier 102 in time slots 606 and 614. Challenge message 101 is not transmitted in time slot 606 and 614. In an embodiment, both the verifier 102 and the prover 120 transmit a signal at the same frequency in time slots 604, 608, and 612 (depicted as the signal 620). Because signal 620 is a bi-directional phase signal, meaningful data is not transmitted during time slots 604, 608, and 612. In other words, all that is transmitted during time slots 604, 608, and 612 is meaningless noise (i.e., data that is not meaningful with respect to the operation of verifier 102 or prover 120). Although FIG. 6 depicts the transmission of challenge message 101, response message 107, and signal 620 during particular time slots, each of these signals may be transmitted in any time slot.

Like in the examples from FIGS. 4 and 5, the duration of the time slots 602-614 may vary. In the example shown in FIG. 6, time slot 602 is shorter than time slot 604 which is longer than time slot 606 which is shorter than time slot 608 which is longer than time slot 610 which is longer than time slot 612 which is shorter than time slot 614. In fact, each of time slots 602-614 may have a different duration. Because the time slots 602-614 all vary in duration, and in some embodiments, there is no relationship to the duration of each time slot to the next or any other time slot, the duration of each of time slots 602-614 appears random to any outside device (e.g., attack kits 106 and 108). In an embodiment, the duration of each of time slots 602-614 is less than a threshold value. Therefore, the duration of each of time slots 602-614 is minimized.

Additionally, in an embodiment, the transmit power for each signal during each of time slots 602-614 is not necessarily the same as the transmit power during any of the other time slots. For example in FIG. 6, the transmit power in time slots 602 and 604 is the same while the transmit power for each of time slots 606-614 is different. Thus, even if a relay (e.g., attack kits 106 and 108) employs power level detection as a means to identify meaningful message exchange direction, the relay (e.g., attack kits 106 and 108) may be unable to determine which power level employs meaningful data. In some embodiments not depicted in FIG. 6, zero power levels are allowed to randomize transmit power level selection even more. A zero power level is an intentional idle time between active transmit/receive phases.

The duration of each of time slots 602-614, which signal (i.e., challenge message 101, the response message 107, and signal 620) is transmitted in which time slot (in other words, the timing of unidirectional and bi-directional phases), and transmit power for each transmission are negotiated between verifier 102 and prover 120 prior to the first time slot (i.e., time slot 602) or during the first time slot 602. Because this protocol is unknown to the relay (e.g., attack kits 106 and 108), the sequence and timing of the unidirectional and bidirectional phases as well as the power levels of transmissions all appear random to the relay (e.g., attack kits 106 and 108). Since the relay (e.g., attack kits 106 and 108) does not have access to these random appearing parameters, the relay is compelled to utilize a difficult to realize full duplexing relay. Thus, a relay attack is much more difficult to accomplish.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus for reducing the probability of a relay attack, comprising:

a microcontroller;

a receiver wherein the receiver receives a challenge message from a verifier, the challenge message having a challenge message frequency at a first challenge message frequency during a first time slot; and a transmitter wherein the transmitter transmits a response message to the verifier, the response message having a response message frequency at a first response message frequency during the first time slot, the first response message frequency being different than the first challenge message frequency; wherein the probability of the relay attack is reduced as a result of the first response message frequency being different than the first challenge message frequency;

wherein the challenge message frequency is at a second challenge message frequency and the response message frequency is at a second response message frequency during a second time slot, the second challenge message frequency being different than the second response message frequency; wherein the probability of the relay attack is reduced as a result of the second response message frequency being different than the second challenge message frequency;

wherein the frequencies at which the response messages are sent are negotiated between the verifier and the transmitter prior to the first time slot; and wherein the time slots when the response messages are sent are negotiated between the verifier and the transmitter prior to the first time slot.

2. The apparatus of claim 1, wherein the first time slot has a duration that is different than a duration for the second time slot.

3. The apparatus of claim 1, wherein the challenge message is received from the verifier continuously during the first time slot and the response message is transmitted continuously during the first time slot.

4. The apparatus of claim 1, wherein the first and second challenge message frequencies and the first and second response message frequencies are negotiated with the verifier using encrypted messages.

5. The apparatus of claim 1, wherein the verifier comprises a vehicle.

6. An apparatus for reducing the probability of a relay attack, comprising:

a microcontroller;

a receiver wherein the receiver receives, during a first time slot and a third time slot, a challenge message from a verifier at a first frequency; and a transmitter wherein the transmitter transmits, during a second time slot, a response message to the verifier at the first frequency;

wherein each of the first, second, and third time slots have different durations; wherein the probability of the relay attack is reduced as a result of the first, second, and third time slots having different durations; and wherein the transmitter is further configured to transmit a noise signal during a fourth time slot; wherein the probability of the relay attack is reduced as a result of the transmitting noise during the fourth time slot.

7. The apparatus of claim 6 wherein the transmitter is further configured to transmit the response message at a first power level during the second time slot and the noise signal at a second power level during the fourth time slot; wherein the probability of the relay attack is reduced as a result of transmitting the response message at the first power level during the second time slot and the noise signal at a second power level during the fourth time slot.

8. An apparatus for reducing the probability of a relay attack, comprising:

a microcontroller;

a receiver wherein the receiver receives, during a first time slot and a third time slot, a challenge message from a verifier at a first frequency; and a transmitter configured to wherein the transmitter transmits, during a second time slot, a response message to the verifier at the first frequency;

wherein each of the first, second, and third time slots have different durations; wherein the probability of the relay attack is reduced as a result of the first, second, and third time slots having different durations;

wherein the duration of the first, second, and third time slots is less than a threshold value; and wherein the transmitter is further configured to transmit a noise signal during a fourth time slot; wherein the probability of the relay attack is reduced as a result of the transmitting noise during the fourth time slot.

* * * * *